3,480,519
METHOD FOR THE SEPARATION OF $C_6$ TO $C_{10}$ ALPHA OLEFINS FROM $C_6$ TO $C_{10}$ ALPHA OLEFIN EPOXIDES BY AZEOTROPIC AND VACUUM DISTILLATION
Thomas Nelson Baker III, Philadelphia, and Conrad Michalski, Media, Pa., Ming Nan Sheng, Cherry Hill, N.J., Thomas A. Washall, Wilmington, Del., and John G. Zajacek, Strafford, Pa., assignors to Atlantic Richfield Company, Philadelphia, Pa., a corporation of Pennsylvania
No Drawing. Filed Oct. 1, 1968, Ser. No. 764,341
Int. Cl. B01d 3/36, 3/10
U.S. Cl. 203—55                                4 Claims

ABSTRACT OF THE DISCLOSURE $C_6$ to $C_{10}$ alpha olefins are separated from admixture with $C_6$ to $C_{10}$ alpha olefin epoxides by the steps of azeotropic distillation with a $C_4$ alcohol azeotropic distillation with the $C_4$ alcohol and water, vacuum distillation and azeotropic distillation with a $C_5$ alcohol.

BACKGROUND OF THE INVENTION

Field of the invention

This invention relates to a method of separating $C_6$ to $C_{10}$ alpha olefins from admixture with $C_6$ to $C_{10}$ alpha olefin epoxides, i.e. $C_6$ to $C_{10}$ 1,2-epoxyalkanes, by the steps of azeotropic distillation with a $C_4$ aliphatic monohydroxy alcohol to remove overhead the $C_6$ to $C_8$ alpha olefins, azeotropic distillation with the $C_4$ alcohol and water to remove overhead the $C_9$ alpha olefin, vacuum distillation to remove $C_6$ and $C_7$ alpha olefin epoxides and finally azeotropic distillation with a $C_5$ aliphatic monohydric alcohol to remove overhead the $C_{10}$ alpha olefin leaving as bottoms the $C_8$, $C_9$ and $C_{10}$ alpha olefin epoxides.

Prior art

No prior art is known which shows the combination of steps of this invention for the separation of $C_6$ to $C_{10}$ alpha olefins from admixtures with $C_6$ to $C_{10}$ alpha olefin epoxides.

SUMMARY OF THE INVENTION

The 1,2-epoxyalkanes having 6 to 10 carbon atoms in the molecule are useful as monomers in the production by conventional methods of a wide variety of polymeric materials, both homopolymers and copolymers. These compounds because of the reactivity of the oxirane ring can be used as intermediates in the preparation of a very large number of useful compounds by well known chemical reactions.

One method of preparing these compounds involves cracking paraffin wax to give the alpha olefins. These are separated into broad molecular weight fractions, one such fraction being a fraction having from 6 to 10 carbon atoms in the molecules. These alpha olefins are epoxidized by any of the conventional methods including a recent method wherein an organic hydroperoxide is used as the oxidizing agent in the presence of a molybdenum containing catalyst.

When the epoxides are made in this manner the reaction mixture will contain unreacted alpha-olefins as well as the 1,2-epoxyalkanes. These are not separable by ordinary distillation. In accordance with the instant invention a method has been found for separating these compounds by a combination of azeotropic distillation and vacuum distillation. The $C_6$–$C_8$ alpha-olefins are distilled overhead as an azeotrope with a $C_4$ alcohol, for example, tertiary butyl alcohol. The $C_9$ olefin alone or the $C_6$ to $C_9$ olefins can be azeotropically distilled overhead by the use of a combination of water and $C_4$ alcohol. After removing the $C_6$ to $C_9$ olefins the $C_6$ and $C_7$ 1,2-epoxyalkanes are distilled overhead by ordinary vacuum distillation. Finally, the $C_{10}$ alpha-olefin is distilled overhead by azeotropic distillation with a $C_5$ aliphatic monohydroxy alcohol such as n-amyl alcohol, leaving the $C_8$–$C_{10}$ 1,2-epoxyalkanes as a bottoms fraction.

In a specific embodiment of the invention the mixture contains only $C_6$–$C_8$ alpha olefins and 1,2-epoxyalkanes having 6 to 8 carbon atoms. These are separated by azeotropic distillation with a $C_4$ aliphatic monohydric alcohol to remove the olefins overhead.

It is an object of this invention therefore to provide a method for the separation of $C_6$–$C_{10}$ alpha olefins from $C_6$–$C_{10}$ 1,2-epoxyalkanes by a combination of azeotropic distillations and vacuum distillation.

It is a specific object of this invention to separate $C_6$–$C_8$ alpha olefins from $C_6$–$C_8$ 1,2-epoxyalkanes by azeotropic distillation with a $C_4$ alcohol.

Other objects of this invention will be apparent from the following description of the preferred embodiments and the claims.

DESCRIPTION OF THE PREFERRED EMBODIMENTS

The mixtures which are separable by the method of this invention are the straight chain terminal olefins, i.e., alpha olefins having from 6 to 10 carbon atoms in the molecule and the epoxides made from such olefins, i.e., the $C_6$ to $C_{10}$ 1,2-epoxyalkanes. The aliphatic monohydric alcohols which are used to separate the $C_6$ to $C_8$ alpha olefins from the mixture contain 4 carbon atoms, the preferred alcohol being tertiary butyl alcohol. When the mixture contains only $C_6$–$C_8$ alpha olefins and $C_6$–$C_8$ 1,2-epoxyalkanes this is the only step required for separation.

The $C_9$ alpha olefin does not azeotrope with the $C_4$ alcohols but will azeotrope with a mixture of the $C_4$ alcohol and water, forming a ternary mixture. Thus water can be added after the removal of the $C_6$ to $C_8$ olefins or water can be added with the alcohol at the start and an azeotrope of the $C_6$ to $C_9$ olefins, alcohol and water is removed. It is then necessary to separate by ordinary vacuum distillation the $C_6$ and $C_7$ 1,2-epoxyalkanes from the undistilled mixture remaining. The $C_{10}$ alpha olefin is thereafter removed by azeotroping it overhead with a $C_5$ alcohol preferably n-amyl alcohol. The $C_8$, $C_9$ and $C_{10}$ 1,2-epoxyalkanes are left as a bottoms fraction.

The process can be carried out batchwise in a single still or in a semi-continuous manner by using a succession of stills. For example, the charge mixture consisting of $C_6$ to $C_{10}$ alpha olefins and $C_6$ to $C_{10}$, 1,2-epoxyalkanes is fed to the first distillation tower along with tertiary butyl alcohol and the $C_6$–$C_8$ olefins are taken overhead with the tertiary butyl alcohol at a pressure of, for example, 400 mm. In an alternate initial step, the charge together with water and alcohol is charged to the distillation tower and the $C_6$–$C_9$ olefins are taken overhead along with the tertiary butyl alcohol and water. If water is not added initially it must be added after the removal of the $C_6$ to $C_8$ olefins to take the $C_9$ olefin overhead. The tertiary butyl alcohol or the tertiary butyl alcohol and water are removed from the distillate by liquid extraction or extractive distillation in a conventional manner. The bottoms from the first tower is charged to a second tower where the $C_6$ and $C_7$ epoxides are taken overhead by ordinary distillation at 50–100 mm. pressure. The bottoms from the second tower is mixed with n-amyl alcohol and charged to a third tower where the $C_{10}$ olefin is taken overhead as an azeotrope with the n-amyl alcohol at about 100 mm. pressure. The $C_8$, $C_9$ and $C_{10}$ epoxides are taken as bottoms product from the third tower and the $C_5$ alcohol is removed from both overhead and bottoms products from the third tower by liquid extraction or extractive distillation.

$C_6=$ refers to the 6-carbon alpha olefin, the term $C_7=$ refers to the 7-carbon alpha olefin, and so forth, and the term $C_6O$ refers to the 6-carbon 1,2-epoxyalkane, the term $C_7O$ refers to the 7-carbon 1,2-epoxyalkane and so forth. The abbreviation TBA refers to tertiary butyl alcohol and the term n-$C_5OH$ refers to n-amyl alcohol.

TABLE I

| Cut No. | Wt. (g.) | Wt. (Total g.) | Ovhd. (°C.) | Pot (°C.) | Press. (mm.) | $C_6=$ | $C_7=$ | $C_8=$ | $C_9=$ | $C_{10}=$ | $C_6O$ | $C_7O$ | $C_8O$ | $C_9O$ | $C_{10}O$ | $H_2O$ | TBA | n-$C_5OH$ |
|---|---|---|---|---|---|---|---|---|---|---|---|---|---|---|---|---|---|---|
| 1 | 37.5 | | 37–63 | 68–75 | 400 | 31.9 | 27.1 | 6.9 | | | | | | | | | 34.1 | |
| 2 | 38.8 | 76.3 | 63–67 | 75–78 | 400 | | 2.7 | 5.1 | | | | | | | | | 92.2 | |
| 3 | 38.7 | 115.0 | 67 | 78–84 | 400 | | | 4.4 | | | | | | | | | 95.6 | |
| 4 | 28.1 | 143.0 | 67 | 84.100 | 400 | | | 4.2 | | | | | | | | | 95.8 | |
| 100 g. of 12% $H_2O$, 88% TBA added to pot | | | | | | | | | | | | | | | | | | |
| 5 | 25.4 | 168.5 | 63–65 | 70–71 | 400 | | | 8.3 | 5.1 | | | | | | | 10.0 | 76.6 | |
| 6 | 40.9 | 209.4 | 65 | 71–78 | 400 | | | 2.0 | 5.0 | | | | | | | 12.6 | 80.4 | |
| 7 | 25.7 | 235.1 | 65 | 78–92 | 400 | | | 0.7 | 2.0 | | | | | | | 11.6 | 85.7 | |
| 75 g. TBA plus 25 g. $H_2O$ added to pot | | | | | | | | | | | | | | | | | | |
| 8 | 22.0 | 257.1 | 64–65 | 69–70 | 400 | | | | 5.0 | | | | | | | 12.6 | 82.4 | |
| 9 | 39.9 | 297.0 | 65 | 70 | 400 | | | | 5.3 | | | | | | | 10.4 | 84.3 | |
| 50 g. TBA added to pot | | | | | | | | | | | | | | | | | | |
| 10 | 40.7 | 337.7 | 65 | 70–71 | 400 | | | | 3.4 | | | | | | | 2.2 | 94.4 | |
| 11 | 40.1 | 377.8 | 65 | 71–74 | 400 | | | | 1.9 | | | | | | | 3.6 | 94.5 | |
| 50 g. TBA plus 10 g. $H_2O$ added to pot | | | | | | | | | | | | | | | | | | |
| 12 | 40.5 | 418.3 | 65 | 71 | 400 | | | | 1.1 | | | | | | | 12.8 | 86.1 | |
| 13 | 36.1 | 454.4 | 65 | 71–75 | 400 | | | | 0.6 | | | | | | | 10.8 | 88.6 | |
| 14 | 21.7 | 476.1 | 65 | 75–110 | 400 | | | | 0.7 | | | | | | | 10.3 | 89.0 | |
| 15 | 5.1 | 481.2 | 50→37 | 50→100 | 200→100 | | | | | | 10.9 | | | | | 6.8 | 82.3 | |
| 16 | 11.9 | 493.1 | 30–45 | 50–95 | 50 | | | | | | 45.0 | 5.9 | | | | 31.9 | 17.2 | |
| 17 | 8.1 | 501.2 | 45–60 | 95–100 | 50 | | | | | | 95.7 | 3.1 | | | | | 1.2 | |
| 18 | 8.5 | 509.7 | 60–66 | 100–105 | 50 | | | | | | 2.7 | 97.3 | | | | | | |
| 19 | 6.8 | 516.5 | 66–67 | 105–108 | 50 | | | | | | Tr. | 99+ | | | | | | |
| 50 g. n-$C_5OH$ added to pot | | | | | | | | | | | | | | | | | | |
| 20 | 4.3 | 520.8 | 70–97 | 109–110 | 175 | | | | | 17.3 | | 25.6 | | | | | | 57.1 |
| 21 | 7.6 | 528.4 | 97 | 110–111 | 175 | | | | | 22.9 | | 3.4 | | | | | | 73.7 |
| 22 | 10.2 | 539.6 | 97 | 111–114 | 175 | | | | | 23.5 | | | | | | | | 76.5 |
| 23 | 9.8 | 549.4 | 98 | 114–118 | 175 | | | | | 14.5 | | | | | | | | 85.5 |
| 24 | 4.0 | 553.4 | 98.5 | 118–121 | 175 | | | | | 4.3 | | | | | | | | 95.7 |
| 25 | 3.7 | 557.1 | 99 | 121–124 | 175 | | | | | 2.5 | | | | | | | | 97.5 |
| 26 | 3.5 | 560.6 | 99 | 124–128 | 175 | | | | | 1.5 | | | | | | | | 98.5 |
| Btms | 86.8 | 647.4 | | | | | | | | | | | 20.6 | 19.3 | 19.1 | | | 17.2 |

It is also preferred to carry out the azeotropic distillation at pressures below atmospheric pressure in order that the distillation temperature is kept low enough to avoid decomposition of the epoxides. Pressures of from 50 to 600 mm. are suitable with from 50 mm. to about 400 mm. being preferable.

The example which follows will serve to illustrate the invention in greater detail but it should not be construed as limiting the invention solely thereto.

EXAMPLE I

A distillation was carried out on 225.2 grams of a mixture of $C_6$ to $C_{10}$ alpha olefins and $C_6$ and $C_{10}$ 1,2-epoxyalkanes. The total amount of tertiary butyl alcohol utilized was 337 grams, the amount of water was 47 grams and the amount of n-amyl alcohol was 50 grams. It will be understood of course, that the quantities of the alcohols and water employed should be sufficient to provide the necessary azeotrope to remove the olefins as has been described.

Excessive amounts should be avoided for economic reasons. Accordingly, the most desirable amounts will depend upon the amount of olefins originally present in the mixture.

In the table there is shown a typical distillation run utilizing the above-described quantities of materials. It will be noted that since the quantity of olefins in the mixture was not known it was necessary to add alcohol and water successively to the distillation pot until the desired overhead fractions had been obtained. The column employed was a normal laboratory Todd column and a 10:1 reflux ratio was employed. In the table the composition of the cuts are shown in weight percent. The symbol The total product is tabulated below:

TABLE II

| Component: | Wt. percent |
|---|---|
| TBA | 28.7 |
| $C_6=$ | 5.5 |
| $C_7=$ | 4.2 |
| $C_8=$ | 4.2 |
| $C_9=$ | 3.9 |
| $C_{10}=$ | 3.7 |
| $C_6O$ | 7.3 |
| $C_7O$ | 8.0 |
| $C_8O$ | 7.6 |
| $C_9O$ | 7.3 |
| $C_{10}O$ | 7.0 |

The data show that the tertary butyl alcohol-octene-1 azeotrope had a boiling range of 67° C. at 400 mm. pressure and a composition consisting of 95.7 weight percent tertiary butyl alcohol and 4.3 weight percent octene-1. The $C_9$ olefin did not appear in the overhead until water was added to the pot and then was taken overhead as a ternary azeotrope containing 83.4 weight percent tertiary butyl alcohol, 11.5 weight percent water and 5.1 weight percent $C_9$ olefin. The ternary azeotrope had a boiling point of 65° C. at 400 mm. pressure. After removal of the $C_9$ olefin the $C_6$ and $C_7$ epoxides were taken overhead by distillation at a pressure of about 50 mm. n-Amyl alcohol was then added to the pot and the $C_{10}$ olefin was taken overhead as an azeotrope having a boiling point of 97° C. at 175 mm. and a compositon of 76.5 weight percent n-amyl alcohol, 23.5 weight percent $C_{10}$ olefin. The $C_8$, $C_9$ and $C_{10}$ epoxides remained as a bottoms product.

As many possible embodiments can be made of this invention without departing from the broad scope thereof, it is to be understood that all matter herein set forth is to be interpreted as illustrative and not as unduly limiting the invention.

We claim:

1. A method for separating alpha-olefins having from 6 to 10 carbon atoms in the molecule from admixture with 1,2-epoxyalkanes having from 6 to 10 carbon atoms in the molecule which comprises the steps of azeotropically distilling the admixture with a $C_4$ monohydroxy alcohol to remove overhead the alpha-olefins having from 6 to 8 carbon atoms in the molecule, azeotropically distilling the undistilled portion with water and said $C_4$ alcohol to remove overhead the $C_9$ olefin, vacuum distilling the undistilled portion to remove overhead the 1,2-epoxyalkanes having 6 to 7 carbon atoms in the molecule and azeotropically distilling with an aliphatic monohydric alcohol having 5 carbon atoms in the molecule to remove overhead the alpha-olefin having 10 carbon atoms in the molecule, leaving the 1,2-epoxyalkanes having from 8 to 10 carbon atoms in the molecule as the bottoms fraction.

2. The method according to claim 1 wherein the azeotropic distillation is initially carried out with water and the $C_4$ monohydroxy alcohol, to remove overhead the alpha-olefins having from 6 to 9 carbon atoms in the molecule.

3. The method according to claim 1 wherein the alcohol having 4 carbon atoms in the molecule is tertiary butyl alcohol and the alcohol having 5 carbon atoms in the molecule is n-amyl alcohol.

4. The method according to claim 2 wherein the alcohol having 4 carbon atoms in the molecule is tertiary butyl alcohol and the alcohol having 5 carbon atoms in the molecule is n-amyl alcohol.

References Cited

UNITED STATES PATENTS

| | | | |
|---|---|---|---|
| 3,265,593 | 8/1966 | Leis et al. | 203—63 |
| 3,293,269 | 12/1966 | Wolgemuth | 260—348.5 |

WILBUR L. BASCOMB, JR., Primary Examiner

U.S. Cl. X.R.

203—63, 73, 80; 260—348